US010036660B2

(12) United States Patent
Ishihara et al.

(10) Patent No.: US 10,036,660 B2
(45) Date of Patent: Jul. 31, 2018

(54) MEASUREMENT DEVICE HAVING VARIABLE OPENING ORIFICE FOR MEASURING AIRFLOW VOLUME AND VENTILATION RESISTANCE OF WIND BLOWING APPARATUS

(71) Applicant: SANYO DENKI CO., LTD., Tokyo (JP)

(72) Inventors: Katsumichi Ishihara, Tokyo (JP); Takahisa Toda, Tokyo (JP); Yo Muramatsu, Tokyo (JP); Masahiro Koike, Tokyo (JP); Hikaru Urushimoto, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 54 days.

(21) Appl. No.: 15/236,631

(22) Filed: Aug. 15, 2016

(65) Prior Publication Data
US 2017/0052045 A1    Feb. 23, 2017

(30) Foreign Application Priority Data

Aug. 20, 2015  (JP) ................. 2015-162733

(51) Int. Cl.
*G01F 1/36*  (2006.01)
*G01F 1/42*  (2006.01)
(Continued)

(52) U.S. Cl.
CPC ............... *G01F 1/363* (2013.01); *G01F 1/42* (2013.01); *G01F 15/00* (2013.01); *G01F 15/06* (2013.01);
(Continued)

(58) Field of Classification Search
None
See application file for complete search history.

(56) References Cited

U.S. PATENT DOCUMENTS 3,840,051 A     10/1974  Koga
3,865,021 A *   2/1975   De Lepeleire ......... F24F 11/043
                                                       1/43
(Continued)

FOREIGN PATENT DOCUMENTS

DE   202011105809 U1   3/2012
FR   2651879           3/1991
(Continued)

OTHER PUBLICATIONS

European Search Report dated Jan. 19, 2017 for the corresponding European Patent Application No. 6183445.2.
(Continued)

*Primary Examiner* — Harshad R Patel
(74) *Attorney, Agent, or Firm* — Rankin, Hill & Clark LLP

(57) ABSTRACT

A measurement device for measuring an airflow volume of a wind-blowing apparatus includes, a housing that includes an air duct with an air inlet and an air outlet, the air inlet being configured to take in air, the air outlet being configured to send out the taken air, an opening member installed inside the air duct, the opening member including an opening allowing the air taken from the air inlet to pass therethrough, pressure sensors configured to measure air pressures before and after the air passes through the opening member in the air duct, and an orifice provided on the opening member to change a size of the opening.

11 Claims, 6 Drawing Sheets

(51) Int. Cl.
  *G01F 15/00* (2006.01)
  *G01F 15/06* (2006.01)
  *F15D 1/00* (2006.01)
  *F24F 110/30* (2018.01)
  *F24F 110/40* (2018.01)

(52) U.S. Cl.
  CPC ........... *F15D 1/001* (2013.01); *F24F 2110/30* (2018.01); *F24F 2110/40* (2018.01)

(56) References Cited

U.S. PATENT DOCUMENTS

| | | | | |
|---|---|---|---|---|
| 5,938,527 | A * | 8/1999 | Oshima | F24F 1/01 454/303 |
| 6,620,038 | B1 * | 9/2003 | Kikuchi | F24F 7/06 454/189 |
| 7,337,678 | B2 * | 3/2008 | Thakre | A61B 5/0876 73/861.52 |
| 8,186,230 | B1 * | 5/2012 | Kelley | G01F 1/42 73/861.42 |
| 8,281,669 | B2 * | 10/2012 | Ertl | G01F 1/363 73/861.52 |
| 8,757,008 | B1 * | 6/2014 | Nelson | G01F 1/44 73/861.42 |
| 2003/0130809 | A1 * | 7/2003 | Cohen | A01K 1/031 702/45 |
| 2003/0130815 | A1 * | 7/2003 | Cohen | A01K 1/031 702/140 |
| 2003/0209084 | A1 * | 11/2003 | Fleming | G01M 9/04 73/861.74 |
| 2005/0024216 | A1 * | 2/2005 | Crooks | F24F 11/0086 340/606 |
| 2010/0143125 | A1 * | 6/2010 | Vogel | F04D 27/006 416/61 |
| 2016/0258791 | A1 * | 9/2016 | Ishihara | G01F 1/34 |
| 2017/0052045 | A1 * | 2/2017 | Ishihara | G01F 1/363 |
| 2017/0067765 | A1 * | 3/2017 | Koike | G01F 1/42 |

FOREIGN PATENT DOCUMENTS

| | | |
|---|---|---|
| GB | 2252632 A1 | 8/1992 |
| JP | 2004309202 A2 | 11/2004 |
| JP | 2005207832 A2 | 8/2005 |
| WO | 0138832 A2 | 5/2001 |
| WO | 2004063676 A1 | 7/2004 |

OTHER PUBLICATIONS

European Office Action dated Dec. 13, 2017 for the corresponding European Patent Application No. 6183445.2.

* cited by examiner

MEASUREMENT DEVICE HAVING VARIABLE OPENING ORIFICE FOR MEASURING AIRFLOW VOLUME AND VENTILATION RESISTANCE OF WIND BLOWING APPARATUS

CROSS-REFERENCE TO RELATED APPLICATION

This application claims priority from Japanese Patent Application No. 2015-162733 filed with the Japan Patent Office on Aug. 20, 2015, the entire content of which is hereby incorporated by reference.

BACKGROUND

1. Technical Field

Embodiments of the present disclosure relate to, for example, a measurement device that measures an airflow volume.

2. Description of the Related Art

There has been known a measurement device that measures an airflow volume. For example, the technique disclosed in JP-A-2004-309202 cools a thermosensor (a thermal sensor) by sending air. This measures an airflow volume based on a temperature difference in the thermosensor before and after sending the air. This technique has been widely known.

A pressure sensor that measures an airflow volume has also been known. For example, the technique disclosed in JP-A-2005-207832 includes the nozzle, which generates differential pressure of air between the first chamber and the second chamber. An airflow volume is measured on the basis of the differential pressure of air between the first chamber and the second chamber, the opening area of the nozzle, and the like.

SUMMARY

A measurement device for measuring an airflow volume of a wind-blowing apparatus includes, a housing that includes an air duct with an air inlet and an air outlet, the air inlet being configured to take in air, the air outlet being configured to send out the taken air, an opening member installed inside the air duct, the opening member including an opening allowing the air taken from the air inlet to pass therethrough, pressure sensors configured to measure air pressures before and after the air passes through the opening member in the air duct, and an orifice provided on the opening member to change a size of the opening.

DESCRIPTION OF THE EMBODIMENTS

Figure 1:
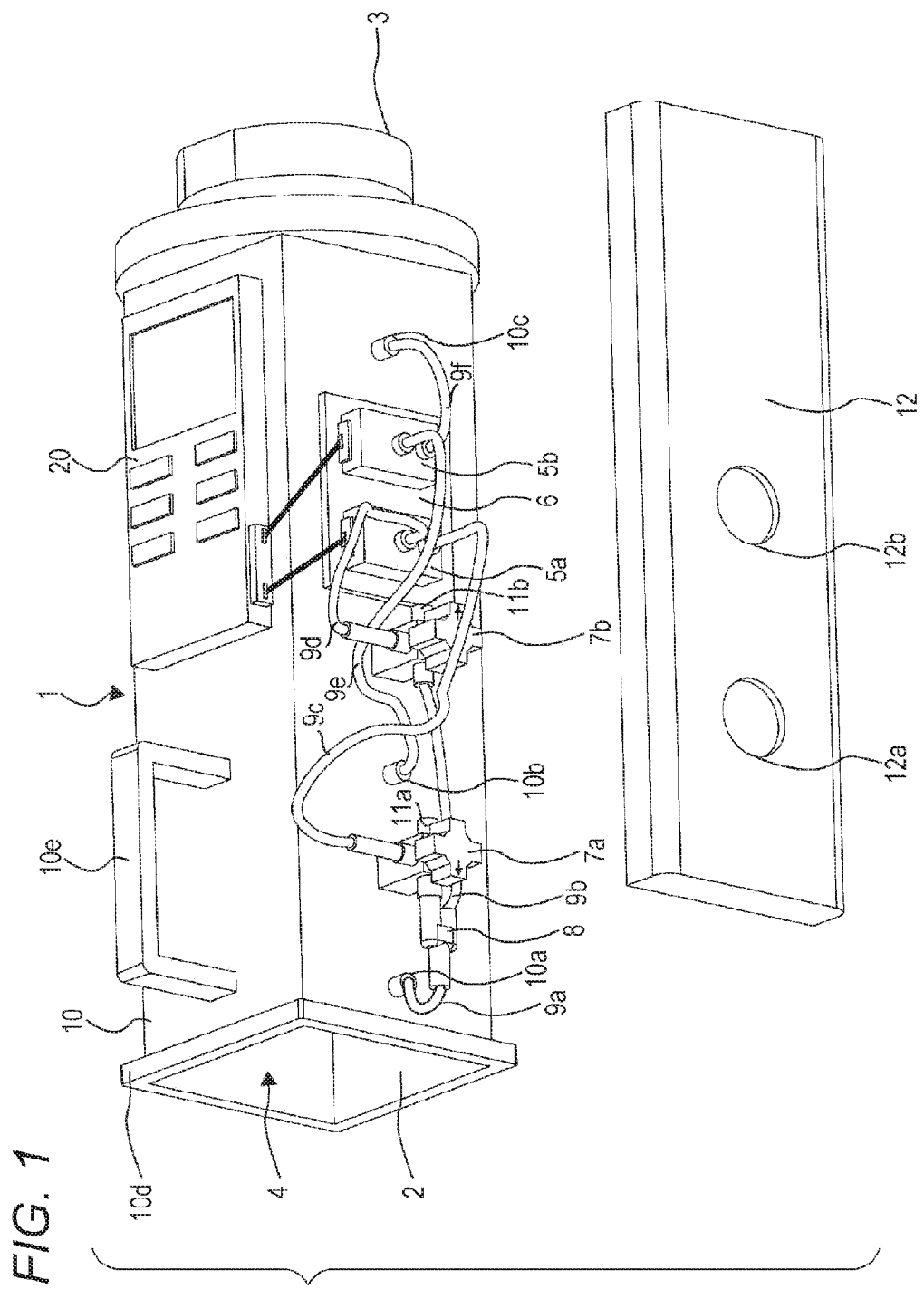
FIG. 1 illustrates an example of external constitution of a measurement device according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The technique that measures the airflow volume using the thermosensor (the thermal sensor), which is as disclosed in JP-A-2004-309202, ensures downsizing the measurement device. However, the measurement device can measure only the airflow volume; therefore, measuring a ventilation resistance against the airflow volume is difficult.

The technique that measures the airflow volume using the pressure sensor, which is as disclosed in JP-A-2005-207832, ensures measuring the airflow volume and the ventilation resistance. As long as the airflow volume is within the range supported by the predetermined size of chamber, opening area of the nozzle, and the like, this technique ensures the measurement. However, with this technique, it is difficult to measure the airflow volumes and the ventilation resistances in various ranges of a device flowing wind such as a server, for example, an information base station, a power supply, a measuring instrument, a ventilating fan, an air curtain, an exhaust duct, a compressor, and a fan (hereinafter referred to as a "wind-blowing apparatus"). In view of this, this technique is poor in versatility.

The technique disclosed in JP-A-2005-207832, for example, needs a nozzle with large opening area to measure a large airflow volume. On the other hand, to measure a small airflow volume, the technique needs a nozzle with small opening area. That is, the use of the nozzle with small opening area for measurement of large airflow volume, for example, generates a whirl of air current returned from the nozzle; therefore, it is difficult to obtain an optimum pressure difference. On the other hand, the use of the nozzle with large opening area for measurement of small airflow volume results in a slight value of pressure difference between the chambers. This considerably deteriorates accuracies of measurements of the airflow volume and the ventilation resistance.

Additionally, the relationship between the sizes of the chambers and the position of the opening disposed on the nozzle affects the range of measurable airflow volume. Accordingly, the technique disclosed in JP-A-2005-207832 ensures only measurement of the airflow volume and the ventilation resistance supported by the predetermined size of chamber, position of the opening disposed on the nozzle, and the like.

One objective of the present disclosure is to provide a measurement device that measures the airflow volume and the ventilation resistance, the measurement device having high versatility and supporting airflow volumes in various ranges.

A measurement device for measuring an airflow volume of a wind-blowing apparatus according to an embodiment of the present disclosure includes, a housing that includes an air duct with an air inlet and an air outlet, the air inlet being configured to take in air, the air outlet being configured to send out the taken air, an opening member installed inside the air duct, the opening member including an opening allowing the air taken from the air inlet to pass therethrough, pressure sensors configured to measure air pressures before and after the air passes through the opening member in the air duct, and an orifice provided on the opening member to change a size of the opening.

Additional features related to the present disclosure will be apparent from this description and the attached drawings. Aspects of the present disclosure will be accomplished and achieved by aspects of combinations of elements and various elements, a detailed description described later, and a scope of the attached claims. This description describes merely typical examples. This description does not limit the scope of the claims and application examples of the present disclosure by any means.

The measurement device that measures the airflow volume (or at least any one of the airflow volume, a static pressure, and a ventilation resistance) according to embodiments of the present disclosure ensures supporting airflow volumes in various ranges, thus having high versatility.

The following describes the embodiments with reference to the attached drawings. The attached drawings may show functionally identical elements by identical reference numerals. The attached drawings illustrate specific embodiments and mounting examples following a principle of the technique of this disclosure. These drawings are illustrated for understanding of the technique of this disclosure and therefore are not used to limitedly interpret the technique of this disclosure.

This embodiment sufficiently describes the technique of this disclosure in detail to embody the technique by those skilled in the art. Note that, other implementations and configurations are also possible. Modifications of constitutions and structures and various replacements of the elements are possible without departing from the scope and the spirit of a technical idea of this disclosure. Therefore, the following description should not be limitedly interpreted.

Appearance of Measurement Device

FIG. 1 illustrates an example of appearance of a measurement device 1 according to an embodiment of the present disclosure. FIG. 1 is a perspective view illustrating the measurement device 1 from which a protective cover 12 is removed.

Figure 2:
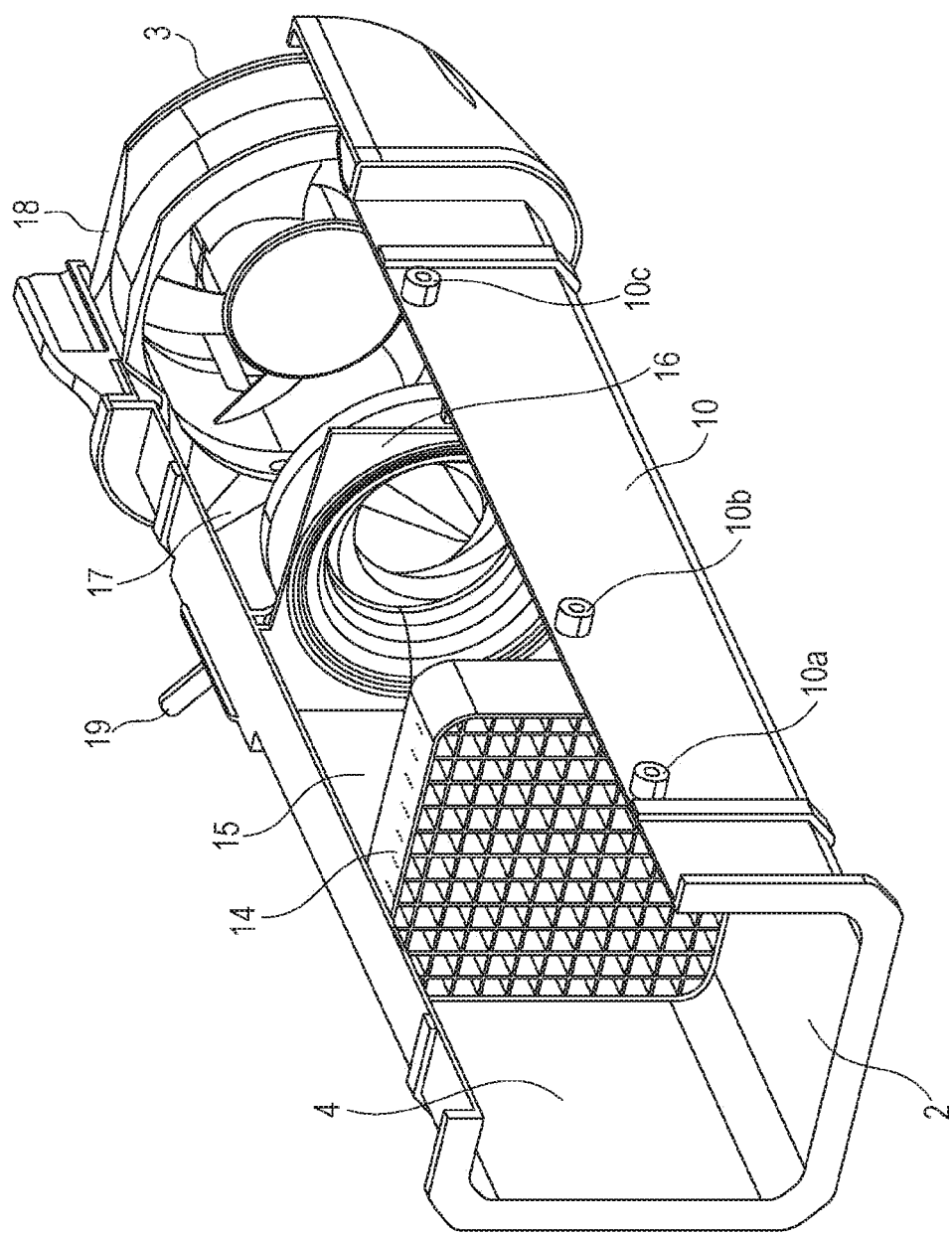
FIG. 2 illustrates an example of an internal constitution of the measurement device.

The measurement device 1 measures the airflow volume, the static pressure and the ventilation resistance of a wind-blowing apparatus. As illustrated in FIGS. 1 and 2, the measurement device 1 includes a casing (housing) 10. The casing 10 includes an air duct 4. The air duct 4 communicates with an air inlet 2 and an air outlet 3. The air inlet 2 takes air sent from the outside (for example, air from the wind-blowing apparatus) into the air duct 4. The air outlet 3 sends out the taken air to the outside of the air duct 4.

A controller 20 is mounted to the top surface of the casing 10. The controller 20 performs control to measure the airflow volume, the static pressure and the ventilation resistance.

As illustrated in FIG. 1, on a first side surface, which is a surface in a first direction on the casing 10, the relay board 6, a first valve 7a and a second valve 7b, a distributor 8, and a plurality of tubes 9a to 9f are mounted. On the relay board 6, a first pressure sensor 5a and a second pressure sensor 5b, which measure air pressure, are mounted. The first pressure sensor 5a is an example of a pressure sensor for static pressure measurement and hereinafter may be referred to as a "static pressure sensor." The second pressure sensor 5b is an example of a pressure sensor for differential pressure measurement and hereinafter may be referred to as a "differential pressure sensor." The first valve 7a and the second valve 7b adjust delivery of air to the first pressure sensor 5a. The distributor 8 distributes the air to two flow passages.

The first pressure sensor 5a and the second pressure sensor 5b, which are mounted to the relay board 6, are sensors to measure the air pressure. The first pressure sensor 5a and the second pressure sensor 5b are differential pressure sensors having two input ports. Specifically, the first pressure sensor 5a and the second pressure sensor 5b include the one (upper) input port, which is the positive input port, and the other (lower) input, which is the negative input port.

In this embodiment, the first pressure sensor 5a and the second pressure sensor 5b are mounted to the relay board 6. Alternatively, the measurement device 1 may not include the relay board 6. In this case, the first pressure sensor 5a and the second pressure sensor 5b may be directly mounted to the casing 10 (the first side surface of the casing 10).

Here, on the first side surface of the casing 10, to measure the air pressure in the air duct 4, three holes, namely, a first opening 10a, a second opening 10b, and a third opening 10c are formed (see FIG. 1).

To the first opening 10a, one end of a first tube 9a is coupled. To the other end of the first tube 9a, the distributor 8 is coupled.

The distributor 8 is coupled to the first tube 9a, a second tube 9b, and the first valve 7a. The distributor 8 distributes air input through the first tube 9a to the second tube 9b and the first valve 7a.

The first valve 7a has three ports. To the two ports of the first valve 7a, the respective distributor 8 and third tube 9c are coupled. The remaining one port of the first valve 7a is a first outside air port 11a to take in outside air. At the first valve 7a, rotation of a cross-shaped adjuster (adjustment of the first valve 7a) switches the air sent out to the third tube 9c. That is, the first valve 7a ensures switching (adjusting) the air sent out to the third tube 9c between the air from the first opening 10a input through the distributor 8 and the outside air input through the first outside air port 11a.

For example, assume that the arrow, which is illustrated in FIG. 1, of the adjuster at the first valve 7a indicates the relay board 6 side or the upper side. Then, the first valve 7a sends out the outside air, which is input through the first outside air port 11a, to the third tube 9c. On the other hand, assume that the arrow of the adjuster at the first valve 7a indicates the distributor 8 side or the lower side. Then, the first valve 7a sends out the air, which is input from the first opening 10a through the distributor 8, to the third tube 9c.

The third tube 9c, which is coupled to the first valve 7a, is coupled to the negative input port of the first pressure sensor 5a. In view of this, to the negative input port of the first pressure sensor 5a, any of the air from the first opening 10a or the outside air input through the first outside air port 11a is input.

The second valve 7b also has three ports similar to the first valve 7a. To the two ports of the second valve 7b, the respective second tube 9b and fourth tube 9d are coupled. The remaining one port of the second valve 7b is a second outside air port 11b to take in the outside air. At the second valve 7b, rotation of a cross-shaped adjuster (adjustment of the second valve 7b) switches the air sent out to the fourth tube 9d. That is, the second valve 7b ensures switching (adjusting) the air sent out to the fourth tube 9d between the air from the first opening 10a input through the second tube 9b and the outside air input through the second outside air port 11b.

For example, assume that the arrow, which is illustrated in FIG. 1, of the adjuster at the second valve 7b indicates the distributor 8 side or the lower side. Then, the second valve 7b sends out the air, which is input from the first opening 10a through the second tube 9b, to the fourth tube 9d. On the other hand, assume that the arrow of the adjuster at the second valve 7b indicates the relay board 6 side or the upper side. Then, the second valve 7b sends out the outside air, which is input through the second outside air port 11b, to the fourth tube 9d.

The fourth tube 9d, which is coupled to the second valve 7b, is coupled to the positive input port of the first pressure sensor 5a. In view of this, to the positive input port of the first pressure sensor 5a, any of the air from the first opening 10a or the outside air input through the second outside air port 11b is input.

Accordingly, the adjustment of the first valve 7a and the second valve 7b ensures selecting the following case (1) or (2).
(1) A case where the air from the first opening 10a is input to the positive input port of the first pressure sensor 5a and the outside air is input to the negative input port of the first pressure sensor 5a
(2) A case where the outside air is input to the positive input port of the first pressure sensor 5a and the air from the first opening 10a is inputs to the negative input port of the first pressure sensor 5a

The adjustment of the first valve 7a and the second valve 7b also ensures inputting identical air (air pressure) to the positive input port and the negative input port of the first pressure sensor 5a. In this case, a determination result by the controller 20 turns out to be an error.

Thus, the measurement device 1 includes the first valve 7a and the second valve 7b. Accordingly, the air input to the positive input port and the negative input port of the first pressure sensor 5a is selectable from any of the air from the first opening 10a and the outside air. Therefore, when the airflow volume, the static pressure and the ventilation resistance of the wind-blowing apparatus are measured (when the air is sent from the measurement-target wind-blowing apparatus), the air pressure from the first opening 10a being a value smaller than pressure of outside air (atmospheric pressure) ensures restraining static pressure of the air through the first opening 10a being negative. That is, the measurement value of the first pressure sensor 5a, which is the differential pressure sensor, can be a positive value.

To the second opening 10b, one end of a fifth tube 9e is coupled. To the other end of the fifth tube 9e, the positive input port of the second pressure sensor 5b is coupled. To the third opening 10c, one end of a sixth tube 9f is coupled. To the other end of the sixth tube 9f, the negative input port of the second pressure sensor 5b is coupled.

In view of this, to the positive input port of the second pressure sensor 5b, the air from the second opening 10b is input. To the negative input port of the second pressure sensor 5b, the air from the third opening 10c is input.

For protection of the above-described relay board 6 to which the first pressure sensor 5a and the second pressure sensor 5b are mounted, distributor 8, and plurality of tubes 9a to 9f from the outside, a protective cover 12 is mounted to the first side surface of the casing 10. In the example illustrated in FIG. 1, to show the relay board 6 and the like, the protective cover 12 is removed.

On the protective cover 12, a first adjusting opening 12a and a second adjusting opening 12b are formed. The first adjusting opening 12a and the second adjusting opening 12b have openings larger than the cross-shaped adjusters of the first valve 7a and the second valve 7b such that the first valve 7a and the second valve 7b can be adjusted even when the protective cover 12 is mounted to the casing 10. The first adjusting opening 12a is formed on a site (a surface) facing the adjuster of the first valve 7a on the protective cover 12 mounted to the casing 10. The second adjusting opening 12b is formed on a site (a surface) facing the adjuster of the second valve 7b on the protective cover 12 mounted to the casing 10.

A flange 10d is formed on the outer peripheral surface on the air inlet 2 side of the casing 10. The flange 10d locks a coupling duct 30 (see FIG. 5), which will be described later. For easily carrying the measurement device 1, a handle 10e is formed on the top surface portion of the casing 10.

Especially, in this embodiment, the casing 10 may be made (formed) of a resin material such as nylon, polyacetal, fluoroplastic, ABS resin, polyethylene, polypropylene, polycarbonate, polyvinylchloride resin, phenolic resin, methacrylate resin, melamine resin, urea resin, and polyurethane. This ensures weight reduction of the measurement device 1 (the casing 10). The casing 10 is probably cooled by air sent from the measurement-target wind-blowing apparatus and is heated by warm air (hot air) from the measurement-target wind-blowing apparatus. Accordingly, to restrain cooling or heating of the handle 10e and the controller 20, the casing 10 is preferably made of a resin material having low thermal conductivity.

Thus, the casing 10 made of resin material ensures the weight reduction of the measurement device 1 (the casing 10). Furthermore, the handle 10e is formed on the top surface portion of the casing 10. This ensures easily carrying the measurement device 1.

Internal Constitution of Measurement Device

FIG. 2 illustrates an example of an internal constitution of the measurement device 1 according to the embodiment. FIG. 2 illustrates the measurement device 1 from which the relay board 6, the first valve 7a, the second valve 7b, the distributor 8, the plurality of the tubes 9a to 9f, and the protective cover 12 are removed and a part of the casing 10 is removed.

As illustrated in FIG. 2, the air duct 4 includes a straightening grid 14, a first chamber 15, the opening member 16, a second chamber 17, and an assistant fan 18. The straightening grid 14 straightens the air taken in from the air inlet 2. In the first chamber 15, the air that has passed through the straightening grid 14 is taken. The opening member 16 has an opening through which the air taken in the first chamber 15 can be passed. That is, the opening member 16 is installed in the air duct and has the opening through which the air taken from the air inlet 2 can be passed. The second chamber 17 takes in the air that has passed through the opening of the opening member 16. The assistant fan 18 sends out the air in the air duct 4 (the air inside the second chamber 17) to the outside.

The straightening grid 14 is constituted so as to have a rectangular grid shape. The straightening grid 14 straightens the air sent from the measurement-target wind-blowing apparatus.

The first chamber 15 forms a space from the straightening grid 14 to the opening member 16. The second chamber 17 forms a space from the opening member 16 to the assistant fan 18.

The opening member 16 is constituted such that a size of an opening on a variable orifice changes according to an operation of a variable lever 19. Here, the variable orifice means a mechanism configured to mechanically enlarge and contract a diameter of an opening on the plate-shaped opening member 16. Details of the opening member 16 will be described later.

The above-described first opening 10a is formed between the air inlet 2 and the straightening grid 14. The first opening 10a is disposed to measure air pressure before the air passes through the straightening grid 14. The second opening 10b is formed at the first chamber 15. The second opening 10b is disposed to measure pressure of the air in the first chamber 15 (the air before passing through the opening member 16). The third opening 10c is formed at the second chamber 17. The third opening 10c is disposed to measure pressure of the air in the second chamber 17 (the air after passing through the opening member 16).

The assistant fan 18 is provided on the air outlet 3 side. The assistant fan 18 assists the air in the air duct 4 sent from the measurement-target wind-blowing apparatus to be sent out to the outside. This assistant fan 18 is a fan made of metal so as to ensure supporting the large airflow volume of the air sent from the measurement-target wind-blowing apparatus. For weight reduction, the assistant fan 18 may be a fan made of resin.

When the air sent from the measurement-target wind-blowing apparatus passes through the air duct 4, this assistant fan 18 allows restraining a reduction in the airflow volume of the air sent from the measurement-target wind-blowing apparatus due to a load (pressure loss) caused by the shape of the air duct 4 itself and an unintended load caused by the length of the air duct 4 in the longitudinal direction or the like. Consequently, an appropriate airflow volume suitable for measurement can be held.

Figure 6:
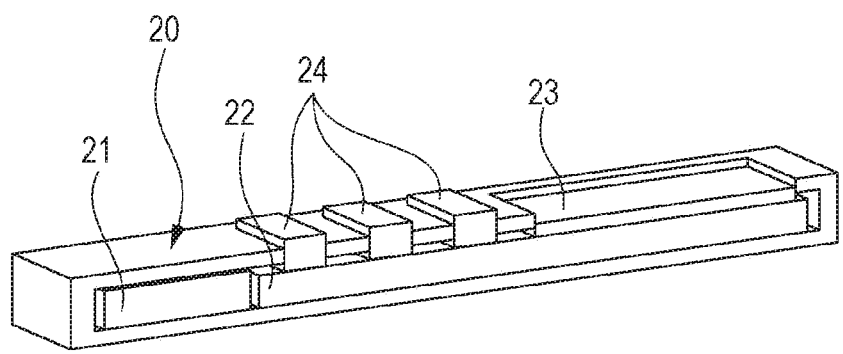
FIG. 6 illustrates an example of a cross section of a controller provided with the measurement device.

For example, as illustrated in FIG. 6, the above-described controller 20 includes a power supply unit 21, which accumulates a power supply, a control board (control unit) 22, and a display 23. The control board 22 calculates the airflow volume, the static pressure and the ventilation resistance. Furthermore, the control board 22 controls driving of the assistant fan 18. The display 23 displays the measured airflow volume, the static pressure, ventilation resistance, and the like. To the control board 22, the first pressure sensor 5a, the second pressure sensor 5b, and the assistant fan 18 are coupled, and the power supply unit 21 and the display 23 are also coupled.

The power supply unit 21 accumulates a power supply voltage from the outside. When the measurement device 1 is carried (when the measurement device 1 is disconnected from the external power supply), this power supply unit 21 ensures performing control by the control board 22. The power supply unit 21 may include a power supply plug instead of having a function of accumulating the power supply voltage from the outside. In this case, the power supply unit 21 may be configured such that electric power supplied from the outside through the power supply plug is supplied to the controller 20 and the like.

The control board 22, for example, mounts various operating buttons 24 such that a measurer can perform various operations. The various operating buttons 24, for example, include a power supply button, which turns on the power supply for the measurement device 1, a measurement start button with which the measurements starts, and a setting button, which sets (or reads) the identification number of the mounted opening member 16.

The control board 22, for example, calculates the airflow volume, the static pressure and the ventilation resistance according to the measurement values measured by the first pressure sensor 5a and the second pressure sensor 5b and drives the assistant fan 18.

Details of Opening Member

Figure 3:
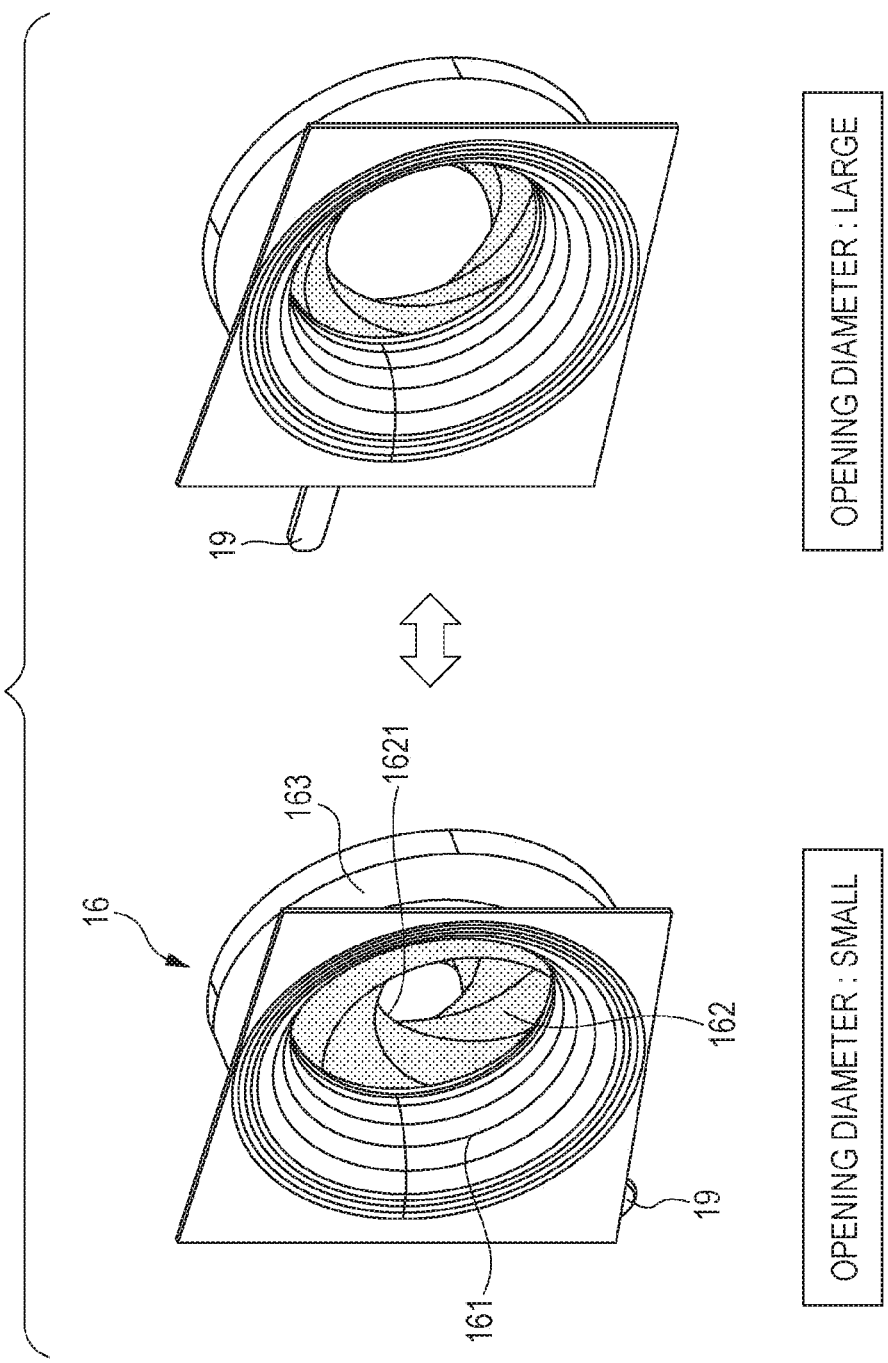
FIG. 3 illustrates an example of a constitution of an opening member of the measurement device.

FIG. 3 illustrates a detailed constitution of the opening member 16 according to the embodiment. The opening member 16 intentionally generates a pressure difference between a pressure of air in the first chamber 15 and a pressure of air in the second chamber 17. The opening member 16 includes an orifice 162. The orifice 162 is used to change the size of the opening on the opening member 16. Furthermore, the opening member 16 includes a differential pressure opening 161 at an approximately center. The differential pressure opening 161 narrows down into a funnel shape from an air current input end of the opening member 16 to a position at which the orifice 162 is installed.

The measurement device 1 that includes the opening member 16 without the differential pressure opening 161 can measure the airflow volume, the differential pressure, and the like. Note that, providing a nozzle structure (shape) on a front surface of the orifice 162 with the differential pressure opening 161 allows the measurement device 1 to further stably measure the airflow volume, the differential pressure, and the like. As one example, an extraction portion (with open/close door) to extract the orifice 162 may be disposed at a side surface of the measurement device 1. This allows easy exchange of the deteriorated or stained orifice 162.

A shape, a position, and the like of the differential pressure opening 161 on the opening member 16 are determinable according to sizes of the first chamber 15 and the second chamber 17. This eliminates a need for increasing the sizes of the chambers more than necessary. Accordingly, the downsizing of the first chamber 15 and the second chamber 17 is possible. Consequently, the downsizing of the measurement device (a gauging apparatus) 1 can be ensured.

The opening member 16 includes the orifice 162. The measurement device 1 includes the variable lever 19, which projects from the casing 10, to move blades of the orifice 162. The orifice 162 changes (enlarges or contracts) the size of the opening (the opening diameter) of the opening member 16 according to the operation (a vertical motion) of the variable lever 19. The orifice 162 includes a plurality of the blades (or fingers). Adjusting a degree of extension of these blades inside a conduit 163 of the opening member 16 by the variable lever 19 changes (enlarges or contracts) the size of the opening (the opening diameter) of the opening member 16. This ensures controlling an amount of a fluid (air) that can flow inside the conduit 163. The variable lever 19 has a groove at a movable portion. This groove is covered with a covering member made of a flexible material such as rubber and packing. This restrains an air leakage. The covering member made of rubber and the like has flexibility; therefore, the motion of the variable lever 19 is less likely to be interrupted.

The respective blades, which constitute the orifice 162, include edges 1621. The respective blades can be made of an appropriate material, for example, metal, polymer, plastic, and any given combination of these materials. The blades can also be made of PTFE-coated metal (for example, stainless steel) or other appropriate reinforcing structures. As the blades of the orifice 162 move toward the center of the conduit 163, the opening defined by the edges 1621 of the blades becomes smaller. The opening member 16 may completely close the opening like a valve when the blades finally reach a maximum closing position.

The diameter of the orifice 162 is changeable between preliminarily selected full-open level and closed level in increments of, for example, 5% and is steplessly changeable. The respective blades of the orifice 162 may be linearly constituted. In this case, the larger number of the blades makes the opening closer to a circular shape. Alternatively, the respective blades of the orifice 162 may be roundedly constituted. In this case, compared with the case of using rectilinear blades, the opening close to the circular shape is achievable with the less number of blades. Enhancing the circularity of the opening eases approximately obtaining a flow feature of an orifice plate.

Figure 4:
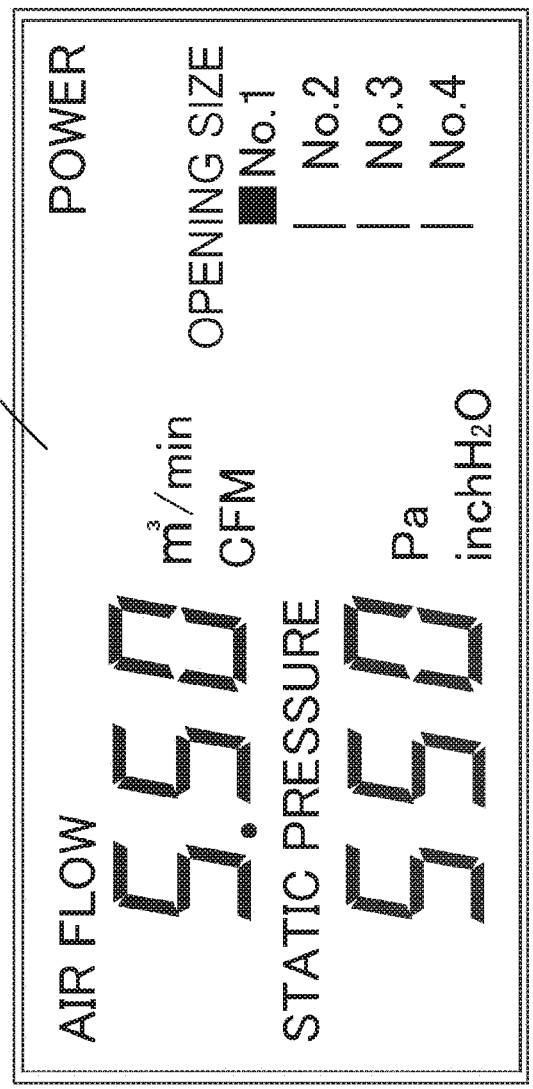
FIG. 4 illustrates an example of a display content displayed on a display of the measurement device.

FIG. 4 illustrates an example of a display content displayed on the display 23 of the measurement device 1. As illustrated in FIG. 4, in this example, the display 23 displays the values of the airflow volume (AIR FLOW) and the static pressure (STATIC PRESSURE) and at least displays an identification number of the size of the opening, which is changed by the orifice 162. Regarding the identification number for the size of the opening, for example, among the preliminarily prepared sizes of the opening, No. 1 indicates the largest size and No. 4 indicates the smallest size. The display 23 may display at least one of the airflow volume, the static pressure, and the ventilation resistance.

The following describes an outline of a control until the display 23 displays the airflow volume and the static pressure.

First, the second pressure sensor 5b measures the air pressures before and after the air passes through the opening member 16 in the air duct 4. That is, the second pressure sensor 5b measures a differential pressure between the air pressure in the first chamber 15 obtained through the second opening 10b (a second pressure) and the air pressure in the second chamber 17 obtained through the third opening 10c (a third pressure). The second pressure sensor 5b outputs the measured differential pressure to the control board 22 as a second differential pressure value. The second pressure is air pressure from the straightening grid 14 to the opening member 16. The third pressure is air pressure after the air has passed through the opening member 16.

The control board 22 calculates the airflow volume of the air sent from the measurement-target wind-blowing apparatus on the basis of the second differential pressure value, which is input from the second pressure sensor 5b, the opening area of the opening member 16, and the like.

The first pressure sensor 5a measures differential pressure (static pressure) between the air pressure before the air passes through the straightening grid 14 obtained through the first opening 10a (a first pressure) and atmospheric pressure of the outside air obtained through the first outside air port 11a or the second outside air port 11b. The first pressure sensor 5a outputs the measured differential pressure to the control board 22 as a first differential pressure value (a static pressure value). The first pressure is air pressure from the air inlet 2 to the straightening grid 14.

The control board 22 calculates a static pressure of air sent from the measurement-target wind-blowing apparatus on the basis of the first differential pressure value, which is input from the first pressure sensor 5a.

Furthermore, the control board 22 may calculate the ventilation resistance of the air sent from the measurement-target wind-blowing apparatus on the basis of the first differential pressure value, which is input from the first pressure sensor 5a, and the calculated value of airflow volume. That is, the control board 22 may calculate the airflow volume on the basis of the differential pressure between the second pressure and the third pressure and may calculate the ventilation resistance on the basis of the calculated airflow volume and the value of the first pressure. That is, the control board 22 may be coupled to the second pressure sensor 5b, calculate the airflow volume and the static pressure of the wind-blowing apparatus using the measured values of the pressure of air before and after passing through the opening member 16, and display the calculated airflow volume and static pressure on the display 23.

As described above, the first pressure sensor 5a and the second pressure sensor 5b measure the first pressure, the second pressure, and the third pressure. The first pressure is air pressure from the air inlet 2 to the straightening grid 14 in the air duct 4. The second pressure is air pressure from the straightening grid 14 to the opening member 16. The third pressure is air pressure after the air has passed through the opening member 16. The control board 22 may calculate the airflow volume of the wind-blowing apparatus on the basis of a differential pressure between the second pressure and the third pressure and calculate the ventilation resistance of the wind-blowing apparatus on the basis of a value of this calculated airflow volume and the value of the first pressure.

Next, to display the calculated airflow volume and the static pressure on the display 23, the control board 22 outputs a display signal, which corresponds to the calculated values of airflow volume and the static pressure, to the display 23.

Thus, as illustrated in FIG. 4, the display 23 displays the values of airflow volume and the static pressure corresponding to the display signal input from the control board 22.

Figure 5:
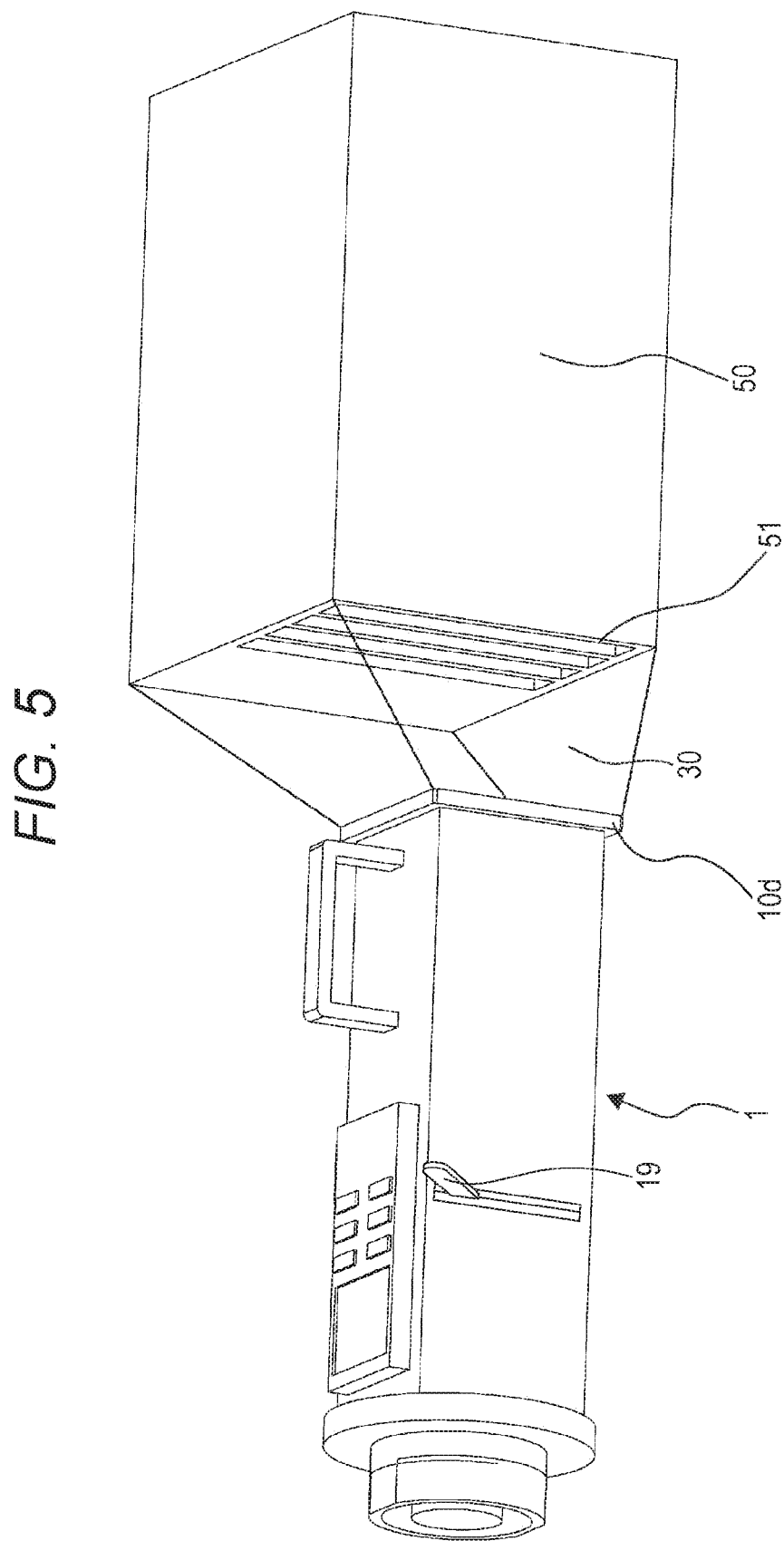
FIG. 5 illustrates an example of a method of using the measurement device.

FIG. 5 illustrates an example of a method of using the measurement device 1 to measure the airflow volume and the static pressure of a measurement-target wind-blowing apparatus 50.

Next, as illustrated in FIG. 5, the measurer installs the coupling duct 30 to an air-sending port 51 of the measurement-target wind-blowing apparatus 50 and the flange 10d of the measurement device 1.

The measurer operates the power supply button for the controller 20 to power-on the measurement device 1. Furthermore, the measurer operates the measurement start button to start the measurement. Afterwards, when the control board 22 completes calculating the airflow volume and the static pressure, the display 23 displays the values of the airflow volume and the static pressure.

As described above, with the measurement device 1 according to this embodiment, the opening diameter of the opening member 16 is changeable by the orifice 162. This allows the measurement device 1 to support the airflow volumes in various ranges (have high versatility).

In this embodiment, the measurement device 1 includes the two differential pressure sensors, the first pressure sensor 5a and the second pressure sensor 5b. Instead of the differential pressure sensors, the measurement device 1 may include the following four pressure sensors. That is, the measurement device 1 may include a pressure sensor to measure atmospheric pressure, a pressure sensor to measure the static pressure of the first opening 10a, a pressure sensor to measure the static pressure of the second opening 10b, and a pressure sensor to measure the static pressure of the third opening 10c.

Furthermore, the measurement device 1 of this embodiment includes the controller 20 mounted to the casing 10. Alternatively, the measurement device 1 may not include the controller 20. For example, instead of the controller 20, the measurement device 1 may include a controller (an external controller) such as a personal computer as an external device (for example, a device separated from the casing). In this case, for example, the measurement values measured by the first pressure sensor 5a and the second pressure sensor 5b may be input to the external controller. Furthermore, the external controller may calculate the values of the airflow volume and the static pressure and display these values on the display 23 (or on another monitor).

Furthermore, in this embodiment, the controller 20 of the measurement device 1 includes the display 23, which displays the airflow volume, the static pressure, and the like. However, the controller 20 of the measurement device 1 may not include the display 23. For example, the controller 20 may be configured to be couplable to an external display such as an LCD monitor. In this case, the controller 20 may output the display signal to the external display to display the values of the airflow volume and the static pressure on the external display.

Summary

Thus, with the orifice of the opening member, the size of the opening on the opening member is easily changeable. This ensures enhancing the versatility of the measurement device to measure the airflow volume and the ventilation resistance. The size of the opening is easily changeable without extracting the opening member and replacing the opening member with an opening member of different opening size. This eliminates a need for preparing a plurality of types of opening members, ensuring a cost reduction of the measurement device. Using the sizes of the chambers as a reference, an opening area of the opening member and the position of the opening corresponding to the sizes of the chambers are determinable. This eliminates a need for increasing the sizes of the chambers more than necessary. Accordingly, the measurement device can be downsized.

With the measurement device according to the embodiment, the casing is made of, for example, a resin material. The control board and the display may be mounted to the casing. The control board may be coupled to the pressure sensor and calculate the airflow volume and the static pressure. The display, for example, may display the airflow volume and the static pressure calculated by the control board.

This ensures weight reduction of the casing. The control board and the display are mounted to the casing of the measurement device. Thus, members having functions regarding the measurement, calculation, and display are collected to one. This eases carrying the lightweight measurement device and ensures measuring the airflow volume, the static pressure, and the ventilation resistance of the wind-blowing apparatuses at various locations.

With the measurement device according to the embodiment, the control board may calculate the airflow volume on the basis of the differential pressure between the second pressure and the third pressure measured by the pressure sensor. Furthermore, the control board may calculate the ventilation resistance on the basis of the calculated airflow volume and the first pressure measured by the pressure sensor.

With the measurement device according to the embodiment, an assistant fan may be disposed at an air outlet opposite to the air inlet on the air duct. The assistant fan sends out air in the air duct to outside.

This assistant fan ensures restraining a reduction in the airflow volume of the air sent from the measurement-target wind-blowing apparatus due to an unintended load caused by the shape of the air duct itself or the like. Consequently, an appropriate airflow volume suitable for measurement can be held. This ensures measuring the airflow volume, the static pressure, and the ventilation resistance more accurately.

In this embodiment, the measurement device 1 measures the airflow volume, the static pressure, and the ventilation resistance of the wind-blowing apparatus. Alternatively, the measurement device 1 may measure any one or two of the airflow volume, the static pressure, and the ventilation resistance of the wind-blowing apparatus. That is, while measuring the airflow volume and the static pressure of the wind-blowing apparatus, the measurement device 1 may not measure the ventilation resistance. Furthermore, while measuring the airflow volume and the ventilation resistance of the wind-blowing apparatus, the measurement device 1 may not measure the static pressure. Furthermore, while measuring the static pressure and the ventilation resistance of the wind-blowing apparatus, the measurement device 1 may not measure the airflow volume.

Furthermore, while measuring the airflow volume of the wind-blowing apparatus, the measurement device 1 may not measure the static pressure and the ventilation resistance. Furthermore, while measuring the static pressure of the wind-blowing apparatus, the measurement device 1 may not measure the airflow volume and the ventilation resistance. Furthermore, while measuring the ventilation resistance of the wind-blowing apparatus, the measurement device 1 may not measure the airflow volume and the static pressure.

The opening member 16 may be constituted to be movable to the longitudinal direction of the air duct 4. For example, the opening member 16 may be constituted to be movable to the longitudinal direction of the air duct 4 between the second opening 10b and the third opening 10c on the air duct 4. In this case, to restrain the position of the opening member 16 moved to the longitudinal direction of the air duct 4 to be displaced due to the air sent from the wind-blowing apparatus, a lock mechanism may be disposed to secure the opening member 16 at the measurement device 1 (the air duct 4).

The first valve 7a may be configured to adjust whether to send out the air from the first opening 10a, which is input through the distributor 8, to the third tube 9c; or to send out the outside air, which is input through the first outside air port 11a, to the third tube 9c by rotation of the cross-shaped adjuster. When the arrow of the adjuster at the first valve 7a indicates the distributor 8 side or the upper side, the first valve 7a may send out the air from the first opening 10a, which is input through the distributor 8, to the third tube 9c.

The second valve 7b may be configured to adjust whether to send out the air from the first opening 10a, which is input through the second tube 9b, to the fourth tube 9d; or to send out the outside air, which is input through the second outside air port 11b, to the fourth tube 9d by rotation of the cross-shaped adjuster. When the arrow of the adjuster at the second valve 7b indicates the relay board 6 side or the upper side, the second valve 7b may send out the outside air, which is input through the second outside air port 11b, to the fourth tube 9d.

It can also be said that FIG. 2 illustrates a cross section of the measurement device 1 from which a part of the casing 10 is removed with the relay board 6, the first valve 7a, the second valve 7b, the distributor 8, a plurality of the tubes 9a to 9f, and the protective cover 12 removed from the measurement device 1.

The opening member 16 may be configured to change the size of the opening of the variable orifice through the operation of the variable lever 19. The variable orifice may be a mechanism that can mechanically enlarge and contract the diameter of the plate-shaped opening.

The opening member 16 may intentionally generate the pressure difference between the pressure of air in the first chamber 15 and the pressure of air in the second chamber 17. The opening member 16 may include the differential pressure opening 161 whose opening narrows down into the funnel shape to the orifice 162 at the approximately center. A constitution only with the orifice 162 does not cause a problem in measurement of the airflow volume and the differential pressure.

In this embodiment, using the sizes of the respective chambers of the first chamber 15 and second chamber 17 as a reference, the shape, the position, and the like of the differential pressure opening 161 of the opening member 16 are determinable according to the sizes of the chambers. This eliminates a need for increasing the sizes of the chambers more than necessary and ensures downsizing the first chamber 15 and the second chamber 17, thus allowing downsizing of the gauging apparatus.

The diameter of the orifice 162 is changeable during the preliminarily selected closed level in increments of, for example, 5% and is steplessly changeable. The respective blades of the orifice 162 may be linearly constituted (In this case, the larger number of the blades makes the opening closer to a circular shape). Alternatively, the respective blades of the orifice 162 may be roundedly curved (In this case, compared with the case of using rectilinear blades, the opening close to the circular shape is achievable with the less number of blades). Enhancing the circularity of the opening further approximates the flow feature of the orifice plate.

The measurement device according to the embodiment may be the following first to seventh measurement devices.

The first measurement device measures an airflow volume and a ventilation resistance of a measurement-target wind-blowing apparatus. The measurement device includes a housing, an opening member, and pressure sensors. The housing constitutes an air duct. The air duct includes an air inlet and an air outlet. The air inlet is configured to take in air. The air outlet is configured to send out the taken air. The opening member is installed inside the air duct. The opening member forms an opening. The air taken from the air inlet is passable through the opening. The pressure sensors are configured to measure air pressures before and after the air passes through the opening member in the air duct. The opening member includes an orifice. The orifice ensures changing a size of the opening.

The second measurement device according to the first measurement device is configured as follows. The opening member further includes a variable lever to move blades of the orifice. The variable lever projects from the housing. An operation of the variable lever allows changing the size of the opening.

The third measurement device according to the first or the second measurement device is configured as follows. The third measurement device further includes a control unit. The control unit is coupled to the pressure sensors. The control unit is configured to calculate the airflow volume and a static pressure using measurement values of the air pressures before and after the air passes through the opening member. The control unit is configured to display these calculated airflow volume and static pressure on a display.

The fourth measurement device according to the third measurement devices is configured as follows. The measurement device further includes a straightening grid configured to straighten the air taken from the air inlet. The pressure sensors are configured to measure a first pressure, a second pressure, and a third pressure. The first pressure is air pressure from the air inlet to the straightening grid. The second pressure is air pressure before the air passes through the opening member. The third pressure is air pressure after the air has passed through the opening member. The control unit is configured to calculate the airflow volume on the basis of a differential pressure between the second pressure and the third pressure. The control unit is configured to calculate the ventilation resistance on the basis of a value of this calculated airflow volume and a value of the first pressure.

The fifth measurement device according to any one of the first to the fourth measurement devices is configured as follows. The measurement device further includes an assistant fan disposed at the air outlet. The assistant fan is configured to send out air in the air duct to outside.

The sixth measurement device according to any one of the first to the fifth measurement devices is configured as follows. The opening member is installed inside the air duct to be movable in a longitudinal direction of the air duct.

The seventh measurement device according any one of the first to the sixth measurement devices is configured as follows. The opening member is formed whose opening narrows down into a funnel shape from an air flow end of this opening member to a position at which the orifice is installed.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A measurement device for measuring an airflow volume of a wind-blowing apparatus, comprising:
    a housing that includes an air duct with an air inlet and an air outlet, the air inlet being configured to take in air, the air outlet being configured to send out the taken air;
    an opening member installed inside the air duct, the opening member including an orifice comprising a plurality of blades, edges of the blades defining an opening allowing the air taken from the air inlet to pass therethrough, a size of the opening being changeable by moving the blades; and
    one or more pressure sensors configured to measure air pressures before and after the air passes through the opening member in the air duct.

2. The measurement device according to claim 1, wherein:
    the opening member further includes a variable lever projecting from the housing to move the blades of the orifice, and
    the orifice changes the size of the opening according to an operation of the variable lever.

3. The measurement device according to claim 2, further comprising:
    a display; and
    a control unit coupled to the one or more pressure sensors, the control unit being configured to calculate the airflow volume and a static pressure of the wind-blowing apparatus using measurement values of the air pressures before and after the air passes through the opening member, the control unit being configured to display the calculated airflow volume and static pressure on the display.

4. The measurement device according to claim 3, further comprising
    a straightening grid configured to straighten the air taken from the air inlet, wherein:

the one or more pressure sensors comprise a first pressure sensor configured to measure a differential pressure between a first pressure and an atmospheric pressure, and a second pressure sensor configured to measure a differential pressure between a second pressure and a third pressure, the first pressure being air pressure from the air inlet to the straightening grid in the air duct, the second pressure being air pressure from the straightening grid to the opening member, the third pressure being air pressure after the air has passed through the opening member, and the control unit is configured to calculate the airflow volume on the basis of a differential pressure between the second pressure and the third pressure and to calculate a ventilation resistance of the wind-blowing apparatus on the basis of a value of the calculated airflow volume and a value of the first pressure.

5. The measurement device according to claim 3, further comprising
a straightening grid configured to straighten the air taken from the air inlet, wherein:
the one or more pressure sensors comprise a first pressure sensor configured to measure a first pressure, a second pressure sensor configured to measure a second pressure, and a third pressure sensor configured to measure a third pressure, the first pressure being a static air pressure from the air inlet to the straightening grid in the air duct, the second pressure being a static air pressure from the straightening grid to the opening member, the third pressure being a static air pressure after the air has passed through the opening member, and
the control unit is configured to calculate the airflow volume on the basis of a differential pressure between the second pressure and the third pressure and to calculate a ventilation resistance of the wind-blowing apparatus on the basis of a value of the calculated airflow volume and a value of the first pressure.

6. The measurement device according to claim 1, further comprising:
a display; and
a control unit coupled to the one or more pressure sensors, the control unit being configured to calculate the airflow volume and a static pressure of the wind-blowing apparatus using measurement values of the air pressures before and after the air passes through the opening member, the control unit being configured to display the calculated airflow volume and static pressure on the display.

7. The measurement device according to claim 6, further comprising
a straightening grid configured to straighten the air taken from the air inlet, wherein:
the one or more pressure sensors comprise a first pressure sensor configured to measure a differential pressure between a first pressure and an atmospheric pressure, and a second pressure sensor configured to measure a differential pressure between a second pressure and a third pressure, the first pressure being air pressure from the air inlet to the straightening grid in the air duct, the second pressure being air pressure from the straightening grid to the opening member, the third pressure being air pressure after the air has passed through the opening member, and the control unit is configured to calculate the airflow volume on the basis of a differential pressure between the second pressure and the third pressure and to calculate a ventilation resistance of the wind-blowing apparatus on the basis of a value of the calculated airflow volume and a value of the first pressure.

8. The measurement device according to claim 6, further comprising
a straightening grid configured to straighten the air taken from the air inlet, wherein:
the one or more pressure sensors comprise a first pressure sensor configured to measure a first pressure, a second pressure sensor configured to measure a second pressure, and a third pressure sensor configured to measure a third pressure, the first pressure being a static air pressure from the air inlet to the straightening grid in the air duct, the second pressure being a static air pressure from the straightening grid to the opening member, the third pressure being a static air pressure after the air has passed through the opening member, and
the control unit is configured to calculate the airflow volume on the basis of a differential pressure between the second pressure and the third pressure and to calculate a ventilation resistance of the wind-blowing apparatus on the basis of a value of the calculated airflow volume and a value of the first pressure.

9. The measurement device according to claim 1, further comprising
an assistant fan disposed at the air outlet, the assistant fan being configured to send out air in the air duct to outside.

10. The measurement device according to claim 1, wherein
the opening member is installed inside the air duct to be movable in a longitudinal direction of the air duct such that a position of the opening member is adjustable in the air duct in the longitudinal direction.

11. The measurement device according to claim 1, wherein
the opening member further includes a differential pressure opening, the differential pressure opening narrowing down into a funnel shape from an air in-flow end of the opening member to a position at which the orifice is installed.

* * * * *